(12) United States Patent
Worzel (10) Patent No.: US 6,327,582 B1
(45) Date of Patent: Dec. 4, 2001

(54) METHOD AND SYSTEM FOR GENETIC PROGRAMMING

(76) Inventor: William P. Worzel, 214 W. Main, Milan, MI (US) 48160

( * ) Notice: Subject to any disclaimer, the term of this patent is extended or adjusted under 35 U.S.C. 154(b) by 0 days.

(21) Appl. No.: 09/142,185
(22) PCT Filed: Mar. 1, 1996
(86) PCT No.: PCT/US96/02758
§ 371 Date: Aug. 31, 1998
§ 102(e) Date: Aug. 31, 1998
(87) PCT Pub. No.: WO97/32261
PCT Pub. Date: Sep. 4, 1997

(51) Int. Cl.⁷ .................................................. G06F 9/445
(52) U.S. Cl. ........................................................ 706/13
(58) Field of Search ............................................. 706/13

(56) References Cited

U.S. PATENT DOCUMENTS

| | | |
|---|---|---|
| 4,697,242 | 9/1987 | Holland et al. . |
| 4,734,848 | 3/1988 | Yamano et al. . |
| 4,821,333 | 4/1989 | Gillies . |
| 4,935,877 | 6/1990 | Koza . |
| 5,048,095 | 9/1991 | Bhanu et al. . |
| 5,136,686 | 8/1992 | Koza . |
| 5,140,530 | 8/1992 | Guha et al. . |
| 5,148,513 | 9/1992 | Koza et al. . |
| 5,222,192 | 6/1993 | Shaefer . |
| 5,249,259 | 9/1993 | Harvey . |
| 5,255,345 | 10/1993 | Shaefer . |

OTHER PUBLICATIONS

CLIP: concept learning from inference patterns, Ken'iche Yoshida, Artificial Intelligence 75 (1995) 63–92.
Book entitled Genetic Algorithms in Search, Optimization and Machine Learning, Goldberg, Addison–Wesley, Reading, MA 1989 ISBN 0–201–15767–5.
Proc. Int's. Conf. on Genetic Algorithms and their Applications Jul. 24–26, 1985, N. L. Cramer A Representation for the Adaptive Generation of Simple Sequential Programs pp. 183–187 1990 Int'l Workshop on Tools for Artificial Intelligence Nov. 6–9, 1990, J.R. Koza, "Genetically Breeding Populations of Computer Programs to Solve Problems in Artificial Intelligence," pp. 819–827.

Proceedings of the Fourteenth Annual Conference of the Cognitive Science Society, Jul. 29 to Aug. 1 1992, P.J. Angeline and J.B. Pollack, "The Evolutionary Induction of Subroutines," pp. 236–241.

Proceedings of the Sixth Int'l Conf. on Genetic Algorithms Jul. 15–19, 1995, T. Haynes et al., Strongly Typed Genetic Programming in Evolving Cooperation Strategies pp. 271–278.

(List continued on next page.)

*Primary Examiner*—Mark R. Powell
*Assistant Examiner*—Michael B. Holmes
(74) *Attorney, Agent, or Firm*—Young & Basile, P.C.

(57) ABSTRACT

A computer-implemented method and system for solving a programming problem using genetic programming techniques. A fitness function measures the relative superiority of a first solution with respect to a second solution. The genetic programming system creates multiple program gene strings containing graph reduction operators. Each program gene string represents a potential solution to the programming problem being solved. Input data is applied to each program gene string to generate a solution for each gene string. Each program gene string is evaluated by comparing the solution to the fitness function. The program gene strings are evolved based on the evaluation of their fitness. The gene strings are repeatedly evolved until a termination criteria has been satisfied.

17 Claims, 6 Drawing Sheets

OTHER PUBLICATIONS

Proceedings of the Sixth Int'l. Conf. on Genetic Algorithms Jul. 15–19, 1995, W.B. Langdon, Evolving Data Structures with Genetic Programming, pp. 295–302.

Proceedings of the Sixth Int'l Conf. on Genetic Algorithms Jul. 15–19, 1995, J.R. Koza Two Ways of Discovering the Size and Shape of a Computer Program to Solve a Problem, pp. 287–294.

Proc. of the Second Int'l Conf. on Genetic Algorithms, 1987 K. DeJong on Using Genetic Algorithms to Search Program Spaces, pp. 210–216.

Proc. of the Second Int'l. Conf. on Genetic Algorithms 1987 C. Fujiki and J. Dickinson, "Using the Genetic Algorithm to Generate LISP Sourc Code to Solve the Prisoner's Dilemma" pp. 236–240.

1990 Int'l Conf. on Computer Languages, Mar. 12–15, 1990 P.J. Koopman, Jr. et al., Cache Performance of Combinator Graph Reduction pp. 39–48.

1990 IEEE Int'l Conf. on Neural Networks, Jun. 17–21, 1990 J. Barnden and K. Srinivas, Dissolving Variables Variables in Connectionist Combinatory Logic pp. III–709 to III–714.

First IEEE Conf. on Evolutionary Computation Jun. 27–29, 1994 S. Handley On the Use of a Directed Acyclic Graph to Represent a Population of Computer Programs pp. 154–159.

METHOD AND SYSTEM FOR GENETIC PROGRAMMING

FIELD OF THE INVENTION

The present invention relates to computing systems for discovering efficient programs through genetic programming techniques. More specifically, the invention combines genetic algorithms with graph reduction techniques to produce a computing system which permits the efficient evolution of programs for solving problems whose input is known and which have a function for determining whether one program is better than another.

BACKGROUND OF THE INVENTION

Most computers built today are of a type known as von Neumann machines. These computers require the transfer of data from memory locations, usually identified by some address or label, to a central processor unit (CPU) where some operation is applied to the data. Often, the data is moved again, either back to its original location or to another memory location. This constant movement of data is inefficient and limits the ability to make a truly parallel machine.

Lambda calculus represents another way to manipulate information to obtain desired results. In lambda calculus, special "lambda expressions" are created to describe a system which closely links data to functions. By using these lambda expressions, a universal programming machine can be constructed which produces results equivalent to those produced by von Neumann machines.

An article written by D. A. Turner ("A New Implementation Technique for Applicative Languages", *Software—Practice and Experience, vol.* 9, no. 1, pp. 31–49, 1979) describes a method of constructing a computing system by abstracting lambda expressions to a simpler and more powerful form called combinators. Combinators were first described by Schonfinkel and Curry in the 1930s, but Turner was the first to propose them as a way of building a computing system. Subsequently Clarke, Gladstone, MacLean and Norman described in detail computational hardware which could be built to ease the implementation of such systems. Since then, additional materials have been written about combinators including U.S. Pat. No. 4,734,848 to Yamano et al, describing parallel combinator hardware.

Combinators are an example of a graph reduction system. That is, a system where programs are represented as lists of elements which are transformed by a set of graph reduction operators. While this invention focuses on combinators because of their compactness and proven universality, the invention covers the use of any and all graph reduction systems, including those which work on strings which represent graphs.

Figure 1:
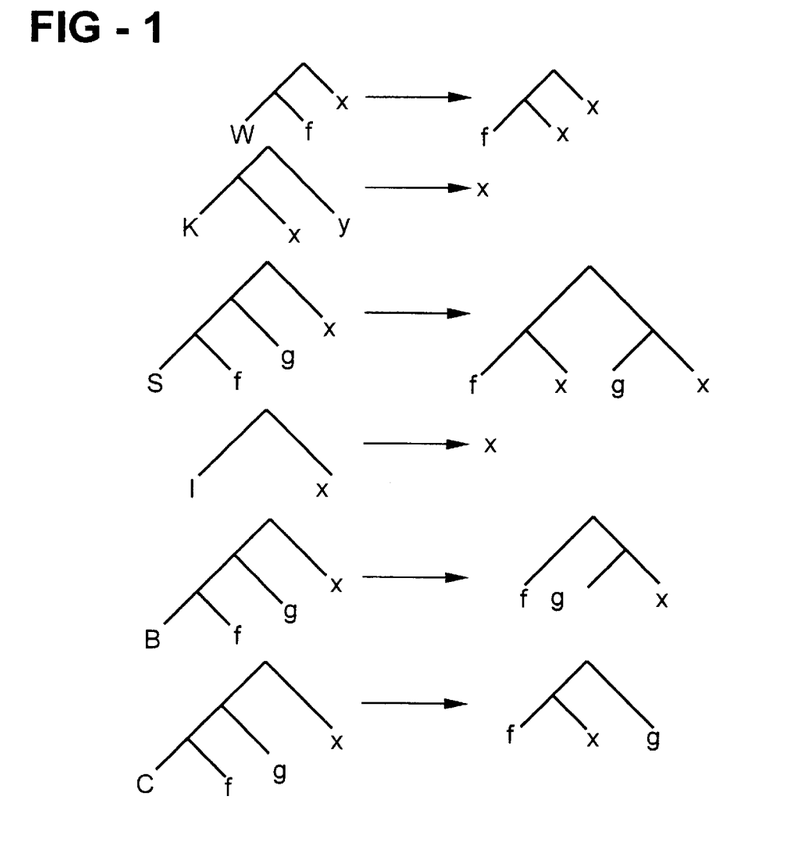
FIG. 1 is a graphical illustration of the functions performed by various combinators.

Combinators K, S, I, B, C, and W are defined by the following functions and illustrated graphically in FIG. 1. In each case, f, g, x and y may be functions, operators, constants, or combinator expressions $Kxy=x$ $Sfgx=fx(gx)$ $Ix=x$ $Bfgx=f(gx)$ $Cfgx=(fx)g$ $Wfx=(fx)x$ If programs are viewed as trees of expressions where each branch of the tree represents a separate part of the program, combinators directly alter program trees to change their structure, thereby changing the results of evaluating the tree. Combinator computing systems usually use bracket abstraction to remove references to variables; i.e., input data which changes each time the program is executed. The bracket abstraction method produces a pure combinator expression having no references to input data. Instead the combinators are applied directly to input data arranged as a graph or tree.

John Holland described the idea of using genetics as a model for solving computational problems in his 1975 monograph, Adaptation in natural and artificial systems. Holland suggested that from several sets of randomly chosen initial values, provided only that there is a way to determine if one value is "better" (as defined in some problem-specific way) than another, a solution can be obtained by combining the "genes" these values represent through a mechanism modeled after evolution.

These "genetic algorithms" provide an efficient method of converging on desired values in a large universe of possible values. If a superior value among a large number of possible values is sought, and if values can be characterized in some regular form such as a binary string, then it is possible to move quickly and efficiently toward the best solution by selecting, mating and occasionally mutating these strings from a relatively small pool of candidates providing only that it is possible to assign a value which represents the quality of a value when compared with other values.

Genetic algorithms are usually demonstrated in programs which look for the maximal or optimal value from a known measurement function such as finding function maxima or minima. For example, the "Traveling Salesperson" problem of searching for the most efficient route of travel among a very large number of possible routes is often used to demonstrate genetic algorithms.

Previous attempts at creating programs using genetic algorithm techniques have included combining genetic algorithms with rule-based systems to provide a method of building complex systems for taking actions. This may be thought of as programming by matching binary values to rules and then evolving the values to find the best combination of rules to solve the problem. This is described in Holland and Burks 1987 U.S. Pat. No. 4,697,242.

In another previous attempt, the principles of genetic algorithms were applied to programming by describing LISP programs and program pieces as potential gene elements and then evolving more complex LISP programs from these elements using the rules of genetic algorithms. This is described both in J. R. Koza's books on genetic programming and in his several genetic programming patents (U.S. Pat. Nos. 4,935,877, 5,136,686, and 5,343,554). These patents suggest that gene strings can be of variable length and that they can be related to computer expressions by one-to-one mapping of the genes to program fragments. Thus, the systems created by Koza require the mapping of gene values used in a genetic algorithm to LISP expressions in order to create new programs.

SUMMARY OF THE INVENTION

The present invention describes a computer system capable of being constructed with custom hardware or implemented as a software state machine, which uses genetic programming and graph reduction techniques to create programs which can solve computational problems. This is accomplished by using a genetic program to successively produce more efficient programs represented in the form of graph reduction operator strings.

This invention covers the use of any graph reduction system as the fundamental method of program representation. A graph reduction system is one where the program is represented by a series of operators which transform or reduce a graph (or list) representation of data or program components. This includes graphs which are represented as strings and graph reduction systems based on string manipulations. Because of their conciseness, universality and simplicity, a graph reduction system based on combinators is presented herein. The program being evaluated is represented in a single gene string, no mapping is required with the present invention. Evaluation of each program string is performed by applying the program gene string to input data and measuring the relative "quality" or "fitness" of the resulting output.

The present invention differs from previous attempts at building genetic programming machines in that the program gene strings themselves are programs. Previous attempts mapped the gene strings to program fragments. This mapping of gene strings is time consuming because it requires continuous data transfers to and from various memory locations throughout the evolution process in order to assemble candidate programs for testing. Through the use of combinators, the present invention eliminates the need for mapping gene strings and repeated data transfers associated with such mapping. Thus, the present genetic programming system is faster than other genetic programming systems which employs the mapping of data and variables.

DETAILED DESCRIPTION OF THE INVENTION

Figure 2:
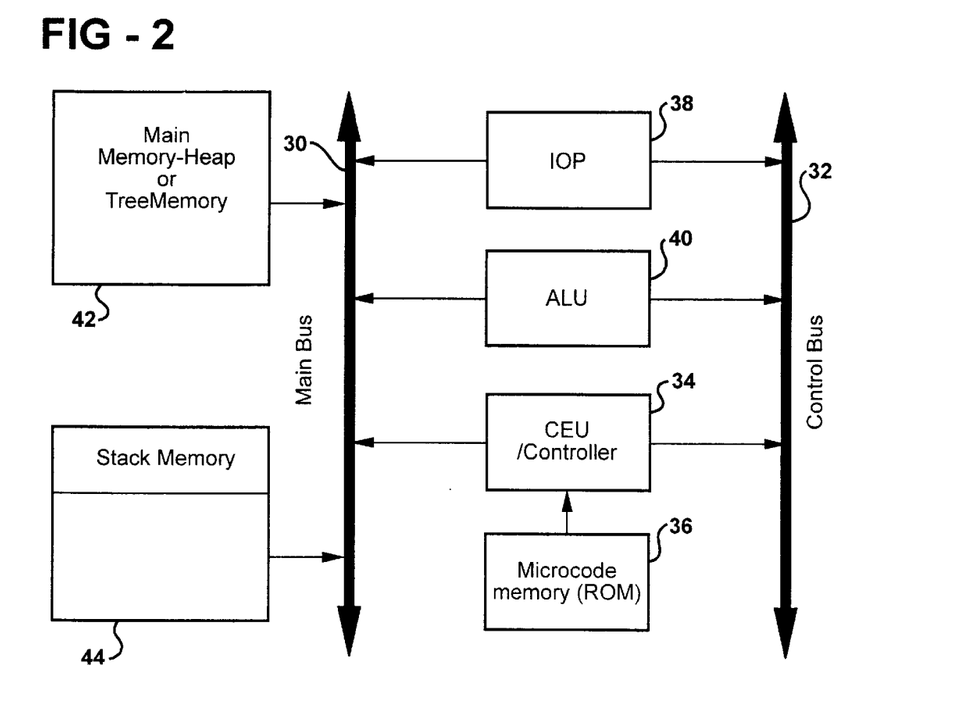
FIG. 2 is a block diagram of a combinator machine used to load and evaluate combinator strings according to the present invention.

In FIG. 2, a main bus 30 provides a pathway for the flow of data between various memory locations and the other system components. A control bus 32 interconnects the various combinator machine components and provides for the flow of control instructions between components. A Combinator Evaluation Unit/Controller (CEU/Controller) 34 is electrically coupled to both buses 30 and 32. CEU/Controller 34 evaluates combinator program gene strings. A microcode memory 36 is a Read Only Memory (ROM) which contains descriptions for evaluating individual combinators. Microcode memory 36 provides the necessary rules and instructions for evaluating various portions of the combinator program gene strings.

In addition to evaluating combinators, CEU/Controller 34 is capable of fetching various elements of the gene string being evaluated. CEU/Controller 34 also controls I/O Processor (IOP) 38 and arithmetic logic unit (ALU) 40, both of which are electrically coupled to both main bus 30 and control bus 32. Control bus 32 is used by CEU/Controller 34 to control the operation of IOP 38 and ALU 40. IOP 38 provides an interface between the combinator machine and other portions of the genetic programming system. ALU 40 is used to evaluate simple arithmetic expressions such as 2+3 and tests such as 3=4.

A main memory 42 and a stack memory 44 are both connected to main bus 30. Main memory 42 contains the program gene string being evaluated by CEU/Controller 34 as well as the input data which the program is applied to. Stack memory 44 stores intermediate states and values generated as a result of evaluating the program gene string. For example, stack memory 44 may store a pointer which recalls where an evaluation was stopped while a sub-evaluation was completed.

Although FIG. 2 illustrates an embodiment of an individual combinator machine, this same architecture can also be implemented as a software state machine running on hardware in a traditional computer system. Using a software implementation, the system's central processing unit (CPU) performs the functions of ALU 40 shown in FIG. 2. CEU/Controller 34 and ALU 40 are replaced by separate programs in a software library which are invoked as necessary. Main memory 42 and stack memory 44 are implemented as blocks of memory within the system's RAM and the system's I/O processing system replaces IOP 38 for the input and output of combinator expressions and data. An evaluator program is used instead of microcode 36 which successively retrieves elements of the particular gene string being evaluated and calls the appropriate combinator library subroutine to implement the evaluation.

Figure 3:
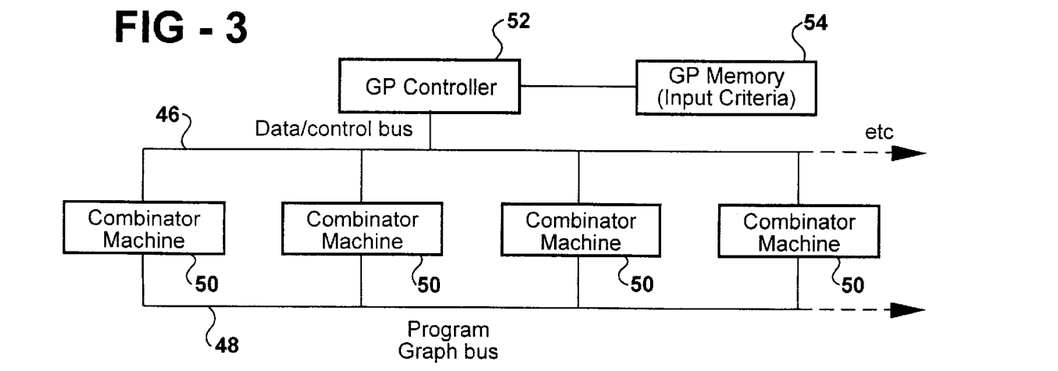
FIG. 3 is a block diagram of a genetic programming system having multiple combinator machines arranged in parallel.

Due to the intrinsically parallel nature of both combinators and genetic programming, the present invention is well-suited for use in parallel processing systems. FIG. 3 shows a block diagram of a genetic programming system utilizing several combinator machines arranged in parallel. Multiple combinator machines 50 are arranged in a parallel manner. Each combinator machine 50 may be implemented in either hardware (as shown in FIG. 2) or software, as described above.

Any number of combinator machines 50 may be arranged in parallel; the number of combinator machines depends on a variety of factors. First, cost limitations may restrict the number of combinator machines used. The greater the number of combinator machines used, the greater the overall cost of the system.

Speed requirements may also dictate the number of combinator machines used in a particular system. A system which requires fast evaluation requires a greater number of combinator machines than a system with lower speed requirements. Additionally, the complexity of the problem to be solved affects the number of combinator machines required in a particular system. Relatively simple problems will generally require fewer combinator machines than complex problems.

Finally, the number of combinator machines used in a genetic programming system varies depending on the number of gene strings being evaluated in a particular generation. A system which needs to evaluate many gene strings in each generation will benefit from a larger number of combinator machines. For example, a genetic programming system which evaluates 100 gene strings in each generation may have 100 combinator machines; i.e., one combinator machine to evaluate each gene string. In such a system, all 100 gene strings are evaluated simultaneously, resulting in faster overall operation of the system.

As shown in FIG. 3, each combinator machine 50 is connected to a data/control bus 46 and a program gene string bus 48. A genetic program controller (GP controller) 52 is connected to data/control bus 46. GP controller 52 controls the overall operation of the genetic programming system by distributing evaluation work among the combinator machines 50, retrieving results from the combinator machines, and evolving the various gene strings.

Figure 8:
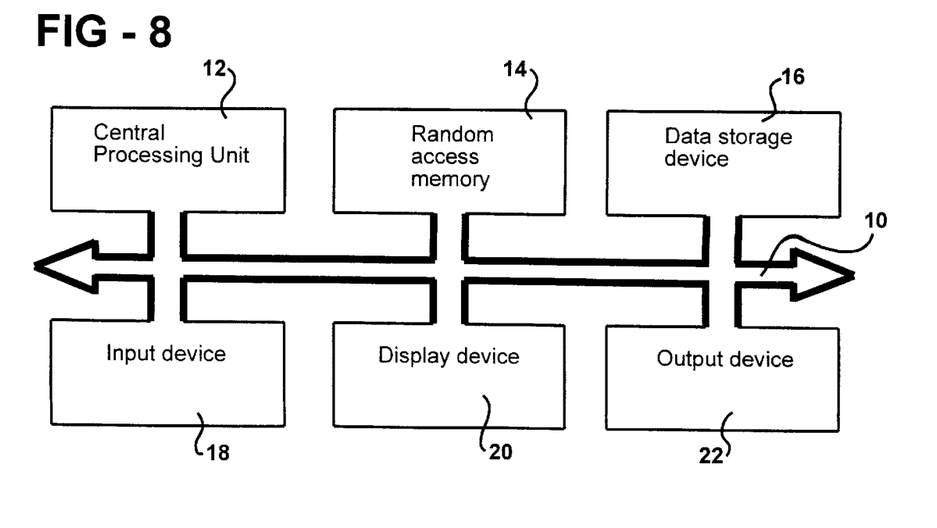
FIG. 8 is a block diagram of a general purpose computer capable of operating as a genetic programming system.

FIG. 8 illustrates a block diagram of a general purpose computer capable of being used with the present invention. A bus 10 interconnects the various system components and provides a common pathway for the flow of data, instructions, and the like. A central processing unit (CPU) 12 is connected to bus 10 and performs the actual computing operations. A random access memory 14 is also connected to bus 10 and provides a location for storing data and other information. A data storage device 16 is connected to bus 10 and provides non-volatile storage of information. Data storage device 16 may be a disk drive, tape drive, or similar storage devices.

An input device 18 is connected to bus 10 and allows a computer user to input data, commands, and other information into the computer system. Input device 18 may be a keyboard, optical scanner, microphone, or other device capable of generating a machine-readable signal for the computer system. The input device used varies depending on the particular application. If a particular system is used for handwriting recognition, the input device must be capable of reading or digitizing a person's handwriting. In that situation, the input device may be an optical scanner, a pressure-sensitive writing tablet, a light pen with a light reader, or other similar device.

In certain situations, multiple input devices are required, For example, a genetic programming system used in a voice recognition system requires a microphone or similar device to input a particular voice pattern as well as a keyboard to input various user-defined parameters.

Referring again to FIG. 8, a display device 20 is connected via bus 10 to the other system components. Display device 20 is a video monitor used to display user-defined parameters, status of program operation, and program results. An output device 22 is also connected to bus 10 and provides a permanent copy of the program results. Preferably, output device 22 is a printer.

Figure 4:
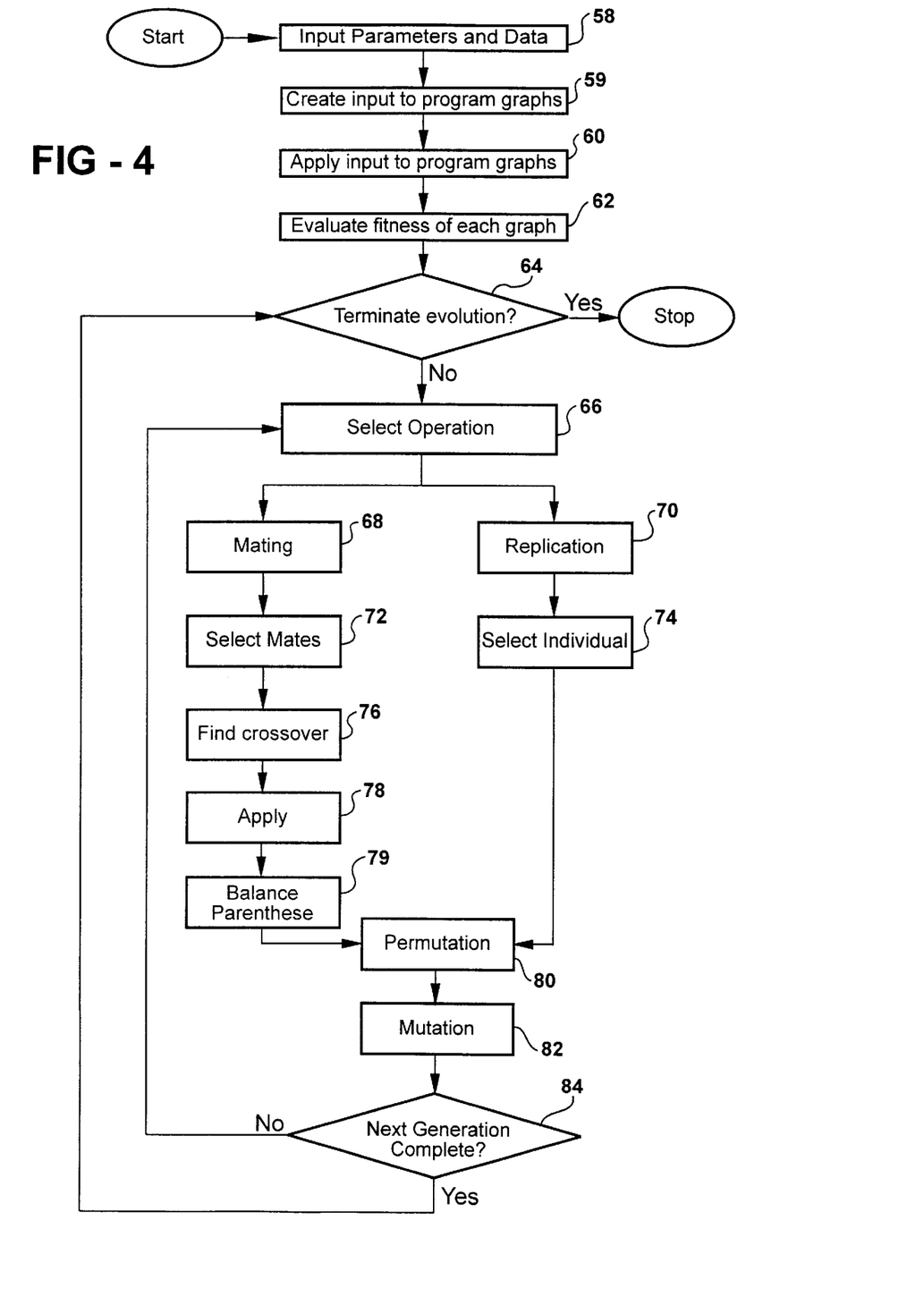
FIG. 4 is a flow chart illustrating the evolution process utilized by the inventive genetic programming system.

The overall operation of the evolution process utilized by the genetic programming system is illustrated in FIG. 4. As shown in step 58, before the genetic programming system can begin evolving gene strings, various parameters and data must be provided to the system.

Figure 5:
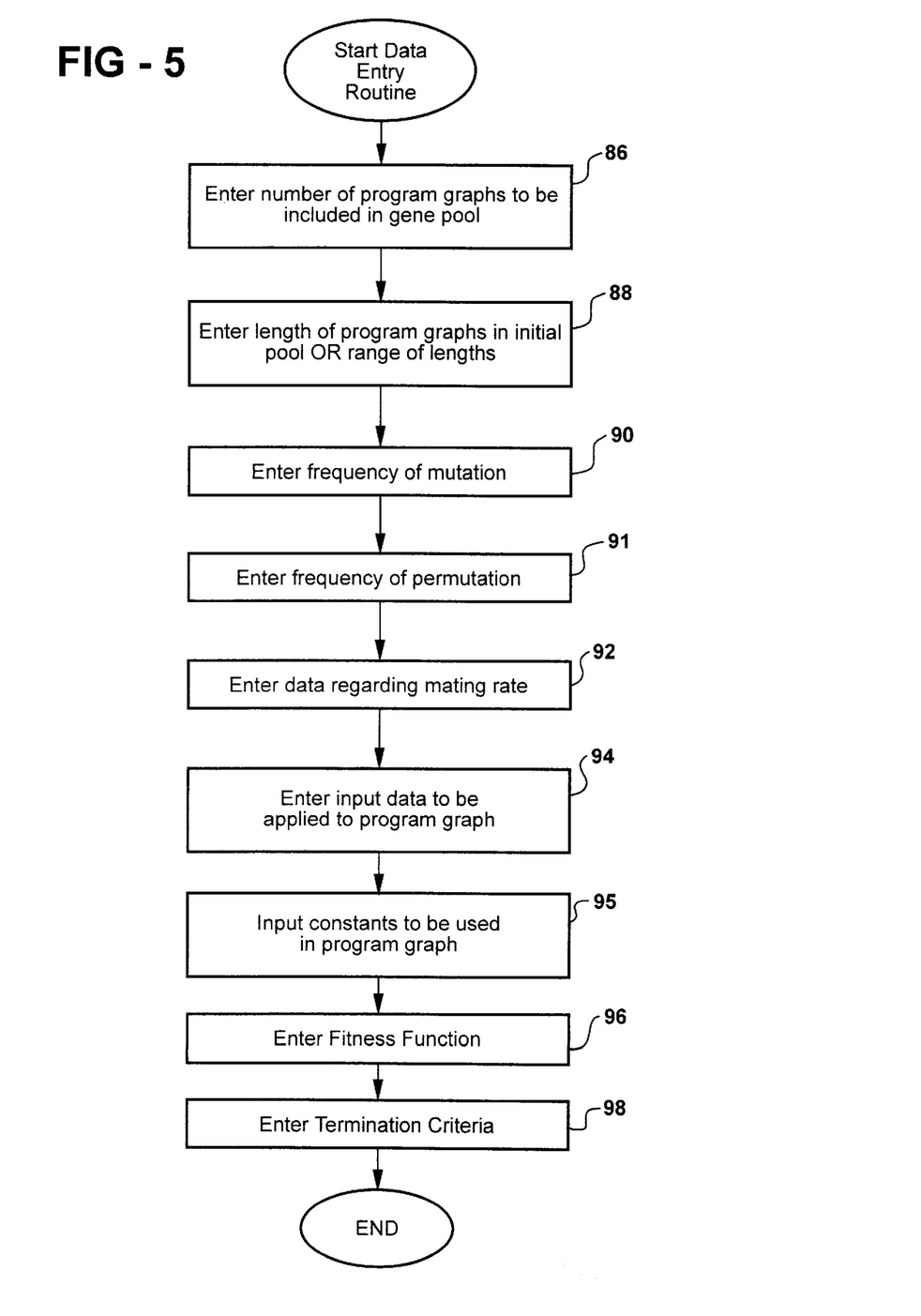
FIG. 5 is a flow chart illustrating the method used to enter the desired input data.

Referring to FIG. 5, at step 86 a user enters the number of gene strings to be included in the gene pool. Next, at step 88, the user enters a preferred length or range of lengths for the initial gene strings. The length of a gene string refers to the number of genes contained in the string. At step 90, the user enters a frequency of mutation of the gene strings. At step 91 the user enters the frequency of permutation of the gene strings. Information regarding the mating rate of the gene strings is entered at step 92.

All of the data entry steps 86–92 may be entered by the user of the genetic programming system as described above. Once entered, the data is stored in a memory device such as GP memory 54 described above with respect to FIG. 3. Alternatively, any of the data entered in steps 86–92 may be permanently stored in the memory device and, therefore, need not be entered by the user. Another alternative provides for default parameter values. If the user does not enter data for a particular step, the default value is used. Finally, the data entered in steps 86–92 can be determined randomly by the genetic programming system within a specified range of values for a given parameter. For example, the probability of mutation may be randomly chosen between the values of 0.001 and 0.01, the length of initial gene strings may be selected between 40 characters and 100 in length, etc.

As shown in FIG. 5, at step 94 the user enters the input data which is to be applied to each program gene string. As discussed above, the input data will vary depending on the problem to be solved. This input data is stored in memory for use by the genetic programming system.

At step 95, the user enters all values which are to be used as constants. As discussed below in the representation of constants in the creation of gene strings, constants may be single character values, strings of characters or numbers. This list of constants input in this step will be used in constructing program gene strings.

At step 96, the user enters a fitness function which is also stored in memory. The fitness function is used to determine whether one result is better than another. Additional details regarding selecting and applying fitness functions are discussed below.

At step 98, a set of termination criteria is entered by the user. This termination criteria is used to determine when evaluation of a particular gene string should be terminated. Additional details regarding determining the termination criteria are provided below.

Referring again to FIG. 4, at step 59 an initial gene pool is created. The gene pool is comprised of program gene strings constructed using combinators. This step requires the random creation of strings of combinators, operators, and constants.

Figure 6:
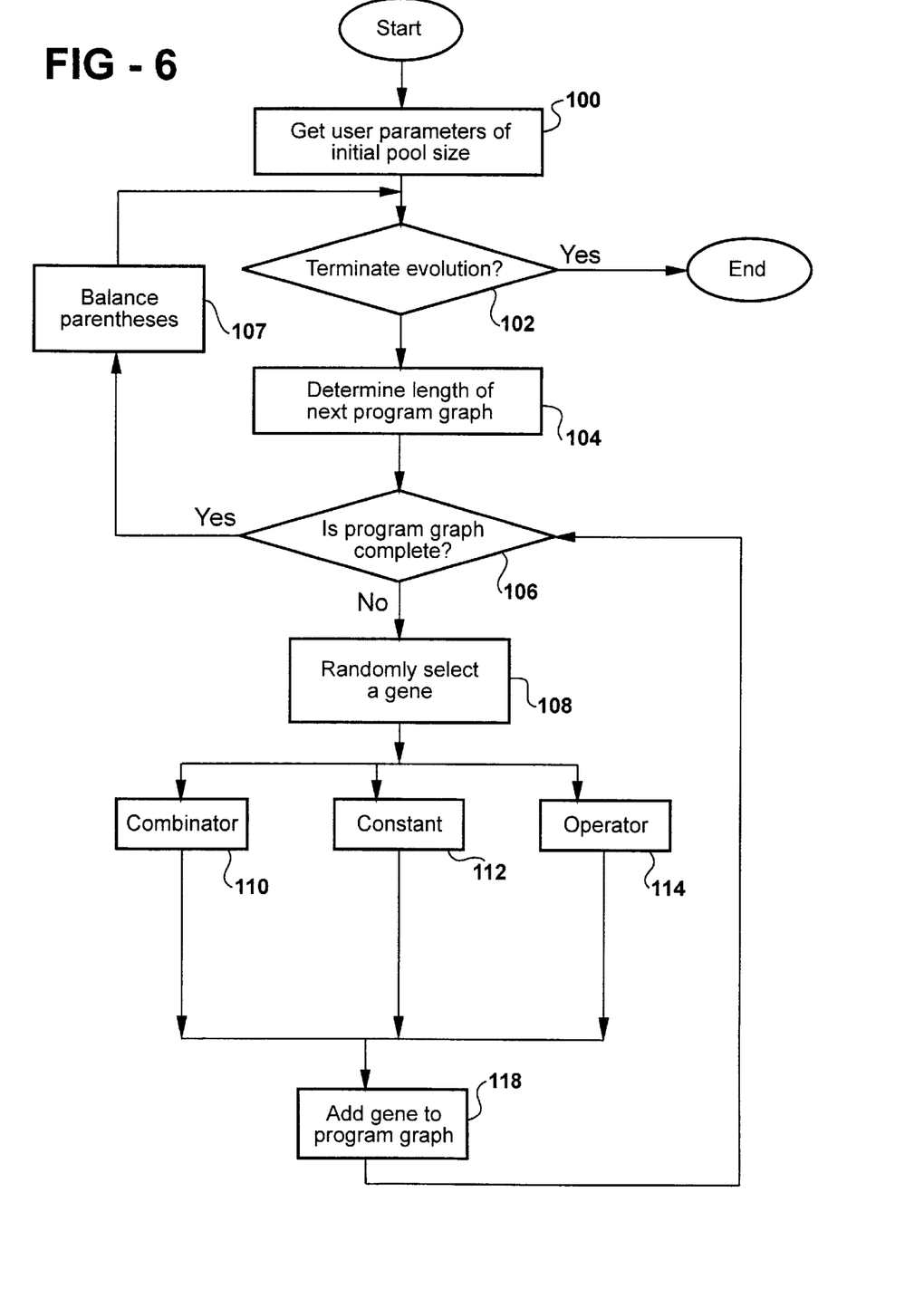
FIG. 6 is a flow chart illustrating the method used to create the initial pool of gene strings.

Referring to FIG. 6, the first step in creating an initial gene pool involves retrieving the parameters regarding the size of the initial gene pool, step 100. The size of the initial gene pool is usually determined by the user based on the estimate of the program complexity and need for variety within the pool of candidates but may also be determined by using a default value or a randomly generated value. At step 102, the routine determines whether the gene pool is full; i.e., whether the number of gene strings in the pool equals the size of the pool determined at step 100. Initially, the gene pool is empty and the routine branches to step 104 where the length of the next gene string is determined. The gene string length may be randomly determined or selected by the user, as described above. Preferably, a range of lengths is used in order to create a wide variety of candidates for the initial pool. For example the first string may be 30 elements long, the next 43, the next 22, etc.

At step 106, the routine determines whether the gene string is long enough; i.e., whether the gene string length equals the length determined in step 104. Initially, creation of the gene string has not started and the routine branches to step 108 where a gene is randomly selected. The gene selected is either a combinator, a constant or an operator. The selection is made by weighted random choice with preference given to combinators.

If a combinator is selected at step 110, the combinator is added to the end of the gene string at step 118. If the combinator is the first gene in the string, it forms the starting point for building the gene string.

If a constant is selected at step 112, the constant is added to the end of the gene string at step 118. As with the combinator above, if the constant is the first gene in the string, it forms the starting point for building the gene string.

The representation of constants in the program gene string is application specific however in general it must include a way to clearly differentiate between operators and constants. For example, if the constant value of the letter 'C' is part of the constants included in gene strings (say for handwriting recognition) it must be clearly different from the 'C' combinator.

There are many ways to do this. The preferred implementation uses the conventions of some programming languages where a character constant is defined as a character with the single quote character around it (e.g., 'C') while the combinator is a "naked" C character (e.g., C). Similarly strings of characters which form constants are surrounded by the double-quote character (e.g, "Fred") while numbers are naked characters in the numeric range (0–9) with an optional decimal point and optional sign character (e.g., −3.14159). In the case of strings they are actually included into the program gene strings as sub-trees of character constants (e.g., 'F' 'r' 'e' 'd')) but may be entered into the lists of possible constants in the double-quote notation ("Fred").

As an alternate to explicitly including constants in the program gene string, the user may simply input such values as seem useful as part of the data the program gene strings are being applied to. For example, a program which is meant to calculate mathematical values might usefully use such mathematical constants as pi, e, etc. A program meant to analyze chemical substances might have chemical constants, etc. By including such constants as a branch of the data the program gene string is applied to, the assumption is that the program gene string can evolve operations which select these constants and use them as necessary in attempting to produce a useful program. With this approach it is possible to simplify the program gene strings so that they only contain combinators and operators however the preferred embodiment is the one described in FIG. 6 where constants are included directly into the program gene string.

After the gene has been added to the gene string at step 118, the routine branches to step 106 to determine whether the string is long enough. Genes are repeatedly added to the gene string until the desired length is obtained. When the gene string is completed, the program branches to step 107 where the parentheses in the generated expressions are balanced.

This is necessary because parenthesis pairs taken together constitute an operator which describes the tree structure of a gene string. For example, the gene string ((2 3+K) (4 7 *) 2 1) has two sub-trees off of it consisting of the strings 2 3+K and 4 7 * respectively in separate branches of the tree along with the two branches holding only the single number 2 and 1.

When a gene string is generated, the open parenthesis character ('(') and the close parenthesis character (')') are treated as separate choices in the list of possible entries in a gene string and so at the end of the step 106, the generated string must be examined and if there are extra open parentheses, enough close parentheses are added at the end of the string to balance the number of open and closes in the string. Likewise if there are more close parentheses characters, open parentheses characters are added to the beginning. While there are other ways to ensure this balancing such as adding both an open and close pair at random locations to the string at the same time, this is considered a superior method of adding the necessary structure to the expressions.

After step 107, the system returns to step 102 to determine whether the gene pool is full. If it is, then creation of the initial gene pool is complete. Otherwise, another gene string is created following the steps described above.

Referring again to FIG. 4, after creating the initial gene pool of combinator strings, the initial generation is evaluated by applying each member to the input data (step 60) and evaluating the fitness (step 62) by applying the fitness function to the results produced in step 60.

In step 60, application of the input data is done by applying the input data to each gene string in the pool to produce a result. Initially, the first generation of gene strings will be composed entirely of randomly generated genes. In later generations, the pool is comprised of the gene strings which have evolved from previous generations. The user-supplied input data is applied to each string to allow combinator reduction on the data by one or more combinator machines. Combinator reduction creates a value or set of values.

In a simple example, if the program gene string is a combinator expression for squaring a number and the program string is applied to the input 5, the result will be 25.

In this step it is necessary to consider what happens when operators are applied to different types of data. For example, a determination must be made as to how a combinator string such as 'A+3' is to be evaluated by the genetic programming system. Preferably, the definition of the '+' operator is extended to produce a result of 'D' (3 letters further on from 'A'). Using this definition, the function of operators must be defined across the entire data types defined in the system. Therefore, if an operator is applied to a list of many elements, the operation should be applied uniformly across the entire list. For example, '3+(1 2 3)' would yield '(4 5 6)' (adding 3 to each number in the list).

In an alternate embodiment, an expression such as 'A+3' may be treated as an illegal combination and thus rejected when the program gene string is evaluated but the previously suggested extension to operators is considered to be a superior solution.

At any time in the application of a gene string to input data a program error may occur. At such a time the application is aborted and the program is given a very low fitness rating. Errors may occur for a variety of reasons but the commonest is that an impossible operation is being attempted. Since gene strings are changing constantly due to the combination of strings it is possible for illegal expressions such as '+*3' to occur. These expressions will cause errors when the program is run and such expressions are eliminated by assigning low fitness ratings in step 62 where program string fitness is assessed.

After applying the input data to the gene strings, the system continues at step 62 where the results obtained are compared with the desired output using the fitness function. Based on the evaluation of the gene strings, each gene string is assigned a fitness value. The fitness value represents the similarity between the output obtained from the gene string and the desired result. Preferably, the fitness value is represented as a numerical value. The fitness function provides an objective measure of "how good" the program is when applied to the input data. This fitness comparison is applied to all program gene strings of a generation and allows the ranking of all gene strings relative to one another. Program gene strings which have a higher fitness value when evaluated by the fitness function are ranked higher than with poorer values. Initially, most randomly generated gene strings will have a poor fitness value, as a result of the random nature of the initial selection process. However, as successive generations are created, the mechanism of evolution develops gene strings with increasingly higher fitness values.

Fitness functions are problem-specific and must be supplied by the user since the system cannot know what a good result is for a particular problem. For example, input data for a handwriting recognition system may be a digitized handwritten sample to which gene strings are applied. The desired output is the actual string of characters contained in the handwriting sample. Each combinator expression is applied to the input data to create and output which is compared to the expected string of characters. In this example, the fitness value may be determined from the number of correctly identified characters positioned in the correct location. Depending on the requirements and preferences of the user, proper order of the letters may be more important than identifying every character. On the other hand, a different user of the same system might place greater emphasis on properly identifying each character rather than properly ordering each identified character.

Initially, the results will be poor and may include some outputs with no correct characters whatsoever, only rearrangements of points. The gene strings whose evaluations produce characters or strings of characters will have higher fitness values than those whose evaluations identified fewer characters. The closer a program's output comes to matching the expected string of characters, the better its fitness value.

At step 64 the system determines whether to terminate evolution. In other words, there must be some criteria for determining when one or more of the gene strings evolved is "good enough" to satisfy the goals of the user. This termination criteria is problem-dependent and must be supplied by the user. A fitness function is used as a measure for determining the relative superiority of one solution as compared to a second solution. Typical termination criteria may require that some threshold value is arrived at when the fitness function is applied. Another possible termination criteria can be the fact that the fitness of the program gene string has not noticeably improved during the last 'n' generations. Alternatively, the termination criteria may be both of these measurements, such that evolution is terminated when either criteria is satisfied.

If the termination criteria is satisfied, then the program is terminated and the best program gene strings created are provided to the user of the system as the best programming solutions for the particular problem. The termination function is input into the system in step 96 of FIG. 5 as discussed above.

Referring again to FIG. 4, if the termination criteria is not reached, the system continues to step 66 where an operation is selected to be used to build the next generation of program gene strings. Either mating (step 68) or replication (step 70) is chosen based in part by the mating rate entered as a system parameter as described in step 92 in FIG. 5.

Once an operation is selected it is applied to the current generation. The mating operation (step 68) involves combining two program gene strings to create two new and different gene strings in the next generation. The replication operation (step 70) involves choosing a program gene string from the current generation and copying it into the next generation.

For both these operations candidates must be chosen from the current generation. In the case of mating, two candidates must be selected (step 72). In the case of replication, a single candidate must be selected (step 74). The preferred method of choosing candidates is to use the fitness rankings to weight the selection of candidates from the current generation. To do this the total of all the fitness ratings of the current generation are summed. The probability of any candidate being selected is then the ratio of its fitness when compared to the total fitness of all candidates.

For example, if the total fitness of all gene strings was 250 and the fitness value of gene string 'A' was 25, then it has a chance of 25/250=10% of being chosen. Similarly if gene string 'B' has a fitness value of 12.5, then it has ½ the chance of 'A' (5%) of being chosen. There are many other strategies to select superior gene strings but this method is used here as an example.

In mating, the gene string is split at one or more locations, called the crossover points, and combined with pieces of other successful gene strings which are similarly split at one or more locations. The simplest and most powerful way to mate two gene strings is to pick an arbitrary point in each gene string, break each string into two parts and then combine each portion of the first gene string with a corresponding portion of the second gene string.

As shown in FIG. 4, after two mates are chosen at step 72 a crossover point is determined for each gene string at step 76. Continuing to step 78, the pieces of two or more gene strings are applied to one another, thereby creating new program gene strings.

In step 79 each newly created string is checked to ensure that the number of open parentheses in the strings are matched by an equal number of close parentheses. This is similar to the parentheses balancing performed in step 107 of FIG. 6 where the initial gene strings are created.

For example if the gene string S(S(B+)1C)KI is mated with B(C(KS)I*)7K1, by random choice it is decide to break the first gene string after the 'B' combinator and to break the second gene string after the 'I' combinator, and then mate the pieces to create the strings: S(S(B*)7K1 and +)1C)KIB (C(KS)I respectively. Note that the first gene string created from this mating: S(S(B*)7K1, has more open parentheses than close parentheses. This expresses an unfinished tree and so a close parentheses is added to create a finished expression of S(S(B*)7K1). In the case of the second gene string: +)1C)KIB(C(KS)I, there are two close parentheses which occur before any open parentheses. These are balanced by adding two parentheses to the beginning of the expression so that it becomes: ((+)1C)KIB(C(KS). Continuing the examination of this string, there is now an extra open parenthesis which is balanced by adding a close parenthesis to the end of the expression. Thus the string becomes: ((+)1C)KIB(C (KS)).

In this example, the result of mating is to produce two gene strings which have different lengths than their parents. This is both typical and necessary because it permits the length of the program gene strings created by mating to change in successive generations thus allowing for additional complexity of gene strings or the simplification of gene strings.

There are various strategies available for mating gene strings and the method described above is a commonly used method. However, the genetic programming system described here is designed to allow users to "override" or replace key elements of the genetic program such as the mating or selection functions since particular problems may require a different approach. Furthermore, the ability to "override" the system provides a greater level of control for users desiring such ability to "customize" each program.

At step 70, a gene string in the current generation is replicated into the next generation. Gene string replication is simply the copying of a gene string into the next generation. This is similar to an individual surviving into the next generation in the natural world. The gene string is not altered, but merely copied into the gene pool for consideration in the next generation. Gene strings which are replicated into the next generation are generally those strings from the previous generation having the highest fitness levels.

Step 74 is where the actual choice of individual for replication is made. This choice is done by weighted random choice as described in step 72 above when choosing mating partners.

Whether strings are mated or replicated in steps 68 or 70 respectively, all strings which are candidates for the next generation are subject to the permutation and mutation operations shown in steps 80 and 82 respectively.

The permutation operation, step 80, is performed by taking the permutation frequency as entered in step 91 of FIG. 5 and randomly checking whether any string has been permuted. If it has, the order of the candidates genes are "scrambled." For example, if the string S(SB(CK)SI)*7K, having been replicated, is randomly checked for permutation. If a random check shows that the string is permuted in the next generation, the resulting string may be S(BC7(CK)*I)SK or any other possible reordering of the gene string. Permutation provides an efficient way to transform a gene string which is close to being a correct solution without having to rely on other genes to produce a mate which will create such a rearrangement. Thus, program gene strings which have a relatively high fitness value may achieve an even higher fitness value of the genes are merely rearranged in a different sequence.

The preferred method of implementation checks each gene in the string for possible permutation based on the permutation frequency. If it is randomly decided to permute the gene, then another gene is randomly chosen and the location of the genes within the program gene string as swapped. For example, if the program gene string is S(K*+3)C(4−)5 and by sequential check it is found that while the first two genes ('S' and '(' respectively) are not permuted (based on the random check against the permutation frequency) but that the 3rd gene ('K') is to be permuted, then by random selection, another gene (say, 'C') is chosen and the two are swapped producing the new program gene string of S(C*+3)K(4−)5. The rest genes would then also be checked before completing the permutation operation.

Since permutation may cause the parentheses in the expression to become scrambled, with unbalanced sequences of opens and closes (e.g., it may cause the string to begin with a close parenthesis), the parenthesis balancing process described in step 79 must be repeated as part of the permutation operation.

The last operator is the mutation operator, step 82. A mutation is when a gene spontaneously transforms itself to another value. The possibility for mutation is based on the mutation frequency as shown in step 90 of FIG. 5. This frequency is used to determine the possibility of any given gene changing its value. For example, if the gene string S(S(B+)1C)KI has a mutation in the C combinator, a new gene is chosen in a manner similar to that used in creating the initial population. The new gene replaces the C combinator and may result in a new string of S(S(B+)1K)KI. Mutations result in gene strings which are noticeably different and may create a radically new gene string with the potential to produce an entirely different approach to solving a problem. Thus, mutation is more likely to produce an innovative result.

As part of the mutation operation, if a parenthesis character is mutated, the parentheses balancing operation described in step 79 for mating must be applied to the new gene string.

Once new candidates have been checked for possible permutations and mutations, they are added to the next generation. In step 84 the new generation is checked for completeness and if it is filled then the system returns to step 60 and begins the cycle again. If it is not filled, the system returns to step 66 and begins the process of mating or replicating in order to continue filling the generation.

One issue to consider is the fact that randomly generated programs cannot be guaranteed to end. This is known in the literature of computer science as the Halting Problem and it has been proven that a programming system cannot predict whether or not a program will ever end.

This creates a problem in that evaluating a particular combinator gene string may produce an endless evaluation of input data, never producing an output. A solution to this endless evaluation problem involves timing the evaluation and terminating any evaluation which does not produce a result within a predetermined period of time. A gene string which cannot be evaluated within the specified time period is either not included in the candidate gene pool for the next generation or is given a very low fitness rating.

Another approach to this problem is possible in a parallel processing system, such as the one shown in FIG. 3. In this case a separate processor (or process if the system is implemented as a software state machine) evaluates each individual program gene string in the gene pool. As gene strings complete their evaluation they become candidates for the replication and mating operations described in steps 68, and 70. Initially there will only be a few candidates but eventually the size of the candidate pool increases. Program gene strings with low fitness values are considered "unattractive" to more highly fit gene strings. The more fit gene strings will resist mating with low fitness gene strings in an attempt to wait for more attractive gene strings which may enter the gene pool later. However, if after a specified period of time no gene string as fit or fitter has appeared, then the highly fit gene string may mate with a less fit gene string.

This solution avoids the Halting Problem by not waiting for all gene strings to appear in the candidate pool. In essence, if a gene string takes a long time to enter the candidate pool, it is not available for mating and so, unless it is exceptionally fit, it will not continue into the next generation. Those gene strings which never appear, never mate. This is similar to "natural selection" where mating availability is in essence an added fitness measure.

In such a system an additional check must be added to avoid situations where too many of the processors are involved in evaluating endless problems. If most or all of the combinator machines are evaluating endless gene strings, the genetic programming system becomes inefficient and may never solve the problem. This situation can be avoided by placing a time limit on the evaluation of any gene string. If a combinator machine cannot evaluate a particular gene string within a predetermined time period, evaluation is stopped and a new gene string is assigned to the processor. For example, a time limit of five seconds may be used for evaluating any given program gene string. If evaluation is not completed within five seconds, evaluation is terminated and the gene string being evaluated is discarded. Thus, gene strings which cannot be evaluated within five seconds will not survive into the next generation. The time limit placed on an evaluation may vary depending on the complexity of the gene strings being evaluated.

A similar but less complex problem arises when a program gene string does not fully resolve itself. That is, after complete evaluation the result still contains combinators and operators. For example, the program gene string * S * I would, when applied to the input data 3 produce the expression * *3 3 which would resolve to the expression * 9. Assuming no defined monadic definition for the * operator, the expression is incomplete in that it lacks a second element for the * operation.

The simplest way to deal with this problem is simply to assign a low-fitness to such expressions. However the preferred implementation is to reapply the expression to the input data. In the above example the expression * 9 would be applied to the input 3 to produce the expression * 9 3 which would yield the result of 27.

As described earlier, FIG. 2 illustrates a combinator machine for evaluating program gene strings containing combinators. The combinator machine includes main memory 42 which is designed to store elements in a tree format, and combinators being implemented as machine primitives. Such dedicated machines are efficient and can be implemented as a single, custom integrated circuit, such as an ASIC, and can be run in parallel with other combinator machines.

Alternatively, a combinator machine can be implemented in software by implementing combinators as stack manipulations. In this version, the tree on which the combinators work is built on a push-down stack mechanism available on most computers currently on the market. Evaluation trees are built as a series of pointers on the machine's stack and the combinators alter the tree by rearranging the order of the elements in the stack as appropriate. This works well because most current processors have efficient stack manipulation operators but have less efficient operators for manipulating tree structures.

In addition to representing the gene strings with combinators, the genetic algorithm operators can also be expressed in combinator form since combinators provide a universal machine. Therefore, if a specialized combinator machine is created, there is no need to have a machine which recognizes anything but combinator expressions.

As described above, FIG. 3 illustrates a genetic programming system with multiple combinator machines arranged in parallel. Due to the need to have several gene strings in the gene pool which must be continually evaluated each generation, there is a natural and effective way to create a parallel processing system. As shown in FIG. 3, each combinator machine is capable of evaluating a combinator gene string given a set of input data. These combinator machines are used to evaluate each of the gene strings in the gene pool. Thus, rather than a sequential evaluation of each program gene string in the gene pool, all gene strings are evaluated simultaneously, thereby enhancing efficiency and speed.

GP controller 52 controls the entire genetic programming system and uses Data/control bus 46 to direct combinator machines 50. GP controller 52 uses the input criteria, data and parameters stored in GP memory 54 which is loaded as part of programming the system. GP memory 54 stores information such as string lengths, mutation and mating rates, as well as input data, fitness function and termination criteria used to evaluate the effectiveness of the program gene strings which are being evolved.

Combinator machines 50 can evaluate arbitrary gene strings when presented with the input data. Additionally, the combinator machines can store instructions to implement the necessary operations used in the genetic algorithm.

Initially, GP controller 52 directs each combinator machine 50 to generate a random gene string from a set of combinators, constants, and operators. GP controller 52 controls mating, permutation and other genetic functions by analyzing the results of a generation as communicated along Data/control bus 46 and issuing appropriate instructions to each combinator machine as to what function it should perform next with respect to each program gene string.

Based on these directions, part or all of a gene string is passed between combinator machines depending on whether they are being reproduced or mated with a gene string in another combinator machine. These gene strings or gene string fragments travel along program gene string bus 48.

The parallel design illustrated in FIG. 3 significantly accelerates the process of evolution towards a superior solution since all program gene strings can be evaluated simultaneously, rather than performing a sequential evaluation of each gene string. Combinator machines 50 are inexpensive and relatively simple to build. Therefore, large, massively parallel computing systems can be constructed using hundreds or thousands of combinator machines.

For long program gene strings, or for problems where there are unused combinator machines; i.e., there are fewer candidates in the gene pool than there are combinator machines available, the evaluation of a single gene string can be broken into pieces and several combinator machines can be used to evaluate each gene string portion. This is possible because all combinators can be evaluated in an order-independent fashion and maintain the same result when all of the combinator pieces are reunited. In other words, a single gene string may be broken into sub-strings A, B and C, each of which are evaluated independently of the others. When the resulting strings are recombined, the final result will be the same as if the string had been evaluated in a single process.

Traveling Salesperson Example

An example of the present invention is illustrated by its application to the well-known traveling salesperson problem. This is an optimization problem where the goal is to find the shortest route for a salesperson to travel to all of his or her sales stops. A table of distances between stops is supplied as input data and the desired route is the one which provides the shortest distance while traveling to each location at least once.

There is no known algorithm or computer program which is guaranteed to provide the shortest route. Due to the large number of choices (n–1 factorial, where n is the number of cities in the problem) the simple approach of calculating all possible routes is very inefficient. For example, in a situation where 15 different cities must be visited, there are almost 90,000,000,000 possible routes between all the cities.

The present invention can find a program solution which will produce one of the better routes given a table of distances between the cities. First, the user creates a tree structure containing the input data; i.e., the distances between all the cities which must be visited. Next, the user inputs the fitness function and the termination function for the problem.

There are two ways to approach the problem. The first approach is what might be called the "weak" form of genetic programming which uses known methods or known solutions written as program gene strings. These known programs are used to populate the initial gene string pool. This is a case of beginning with good initial gene strings in an attempt to find an even better solution. This approach is referred to as the "weak" form of genetic programming because it is less likely to produce an innovative result since all of the initial gene strings represent known solutions. Since the known solutions already produce relatively satisfactory results, the genetic programming system is less likely to produce an innovative result which differs significantly from "conventional wisdom."

However, for this traveling salesperson example, a "strong" form of genetic programming will be used. This "strong" form involves populating the initial gene string pool with randomly generated program gene strings which will be evaluated according to their fitness and selected as described earlier. Although this "strong" form of genetic programming initially produces inferior results and takes longer to find good program gene strings, it offers the possibility of creating a radically new and potentially superior program solution. In essence, the initial program gene strings do not contain any "preconceived notions" as to what the user believes is a good solution to the problem. Instead, the genetic programming system evaluates all possible solutions to the problem rather than limiting itself to a predetermined subset of solutions.

Figure 7:
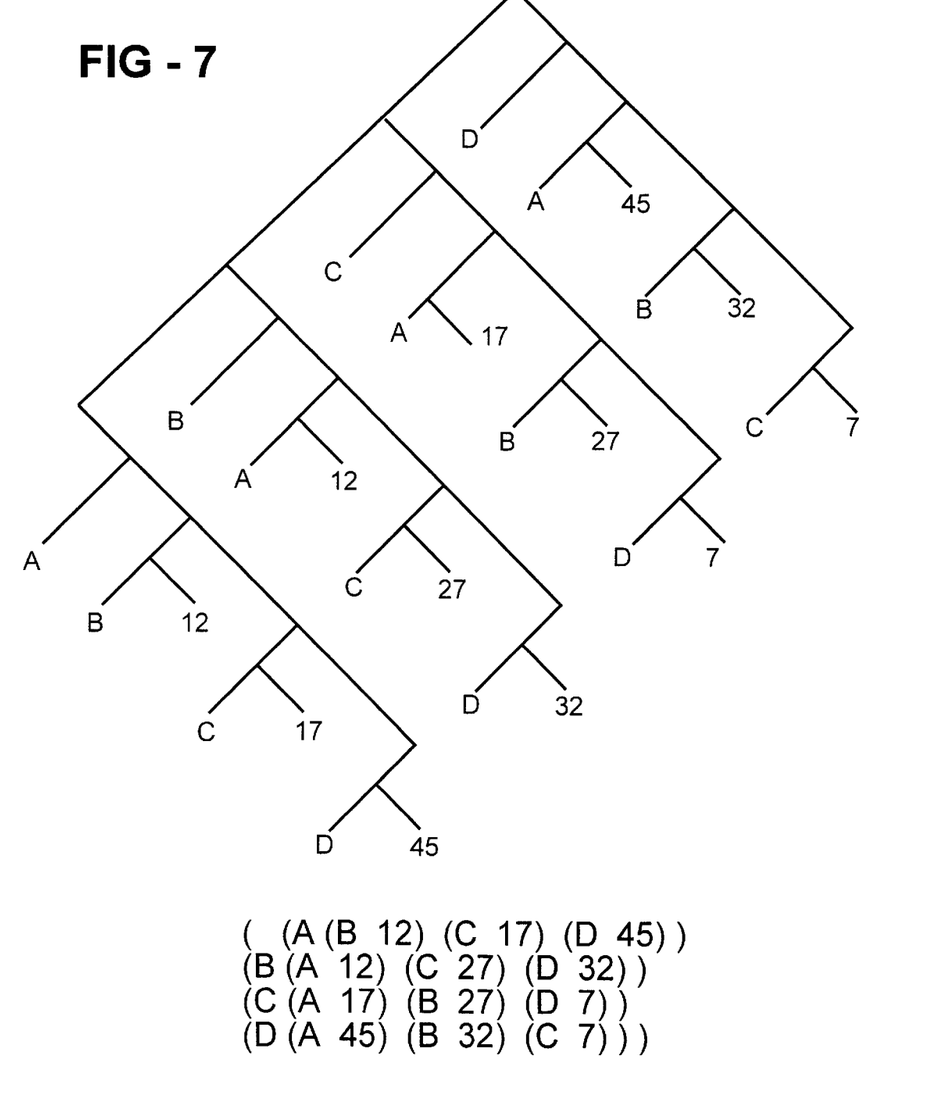
FIG. 7 is a graphical representation of a set of input data shown in a tree structure.

To begin solving the traveling salesperson problem, a tree structure (or, mathematiclly, a graph) is created containing the input of the distance table. Since combinator programs operate on graphs, the input data must be represented as a graph. Such a structure is shown in FIG. 7. This figure illustrates a tree, each of whose branches is a sub-tree describing the distances between the city represented by the branch and the other cities in the tree. The text string shown at the bottom of FIG. 7 is a string representation of the same graph. It is simply a more compact way to describe the same structure. For example, the first branch in the tree represents the distances from city 'A' to all the other cities. Each of these branches have "twigs" consisting of distances and a "label twig" identifying the city these distances are associated with. Thus, the distance from 'A' to 'B' is 12, the distance from 'A' to 'C' is 17, and the distance from 'A' to 'D' is 45. Similarly, the next branch up the tree represents the distances from city 'B' to the other cities; i.e., B to A is 12, B to C is 27, and B to D is 32. The tree continues up to the final sub-tree which gives the distances from city D to the other cities.

The program gene strings generated by the invention are applied to this tree of input to produce a result. The desired result is a list of cities in the order they should be visited.

The fitness function must give the highest ratings to those program gene strings producing the shortest total distance. However, the fitness function must also evaluate candidates which do not produce a complete route. Thus, the first measure of fitness must be whether a particular program gene string selects a complete list of cities.

Since fitness depends on the total distance traveled, a desirable fitness function will produce different values for each program gene string and the lower the value, the better the gene string. Thus, a program gene string which produces a short travel distance will receive a high fitness value. Conversely, a program gene string which produces a long travel distance will receive a low fitness value.

To make a scaled estimate of efficiency of a solution, a tentative solution is compared to a likely worst-case solution. A worst-case solution is generated by finding the longest distance between any two cities in the route and multiplying this distance by the number of cities less one in the route. For example, in FIG. 7 the greatest distance between the 4 cities is 45 (A to D). This distance is multiplied by 4 to obtain a maximum distance of 180 (since 4×45=180).

This worst-case solution is at least as large as any proposed solution since no route which visits all the cities can make the longest trip in all cases unless all distances are the same; i.e., all cities are equidistant from one another, which is not the case in the problem illustrated in FIG. 7. As a result, this fitness function can be used to produce an objective comparison of proposed routes. This is done by producing a ratio of efficiency of travel by dividing the distance traveled in a proposed route by the worst-case route.

The criterion for fitness is then determined by the following function:

$$f=(w(n-v)+d)/w$$

where (FIG. 7 values shown in parentheses):
w=worst case distance (180)
n=number of cities in the entire route (4)
v=number of cities visited in the proposed route
d=distance traveled in proposed route Thus, for the problem shown in FIG. 7, the fitness function becomes f=(180(4−v)+d)/180.

This fitness function sets a premium on completing the route since any program which does not finish will have a large penalty in the form of the worst-case route distance multiplied by the number of cities missed in the proposed route. On the other hand, for all proposed routes which visit all the cities in the salesperson's territory, the first half of the function reduces to 0 (since n−v will be zero) and the second part, d/w, will become the deciding factor. Since w is a constant, the smaller the value of d, the smaller the ratio and the better the fitness. Since the distance is expressed as a ratio, the relative fitness of routes will not be influenced by the scale used to measure distance.

The fitness function works equally well with kilometers, miles or feet. However, to produce an accurate result, all distance values must be represented using the same unit of measure; i.e., all measurements in miles or all measurements in kilometers.

Finally, the user must provide a termination criteria which is used to determine when a particular program gene string is "good enough." In this case we will simply look for a lack of progress in the results. If, for 100 generations (where a generation is the execution of steps 60 through 84 in FIG. 4), the best candidate has not improved by more than 5%, evolution is terminated and the program gene string having the best fitness value is used as the solution to the problem.

However, since we are presumably looking for the best program solution for any set of data, this process must be performed repeatedly for different problems. This is similar to a naturally evolved creature surviving in a number of different situations which test its fitness. In other words, a program solution which works well for one set of input data may not work well for others because the single set of input data used to create the program solution may not be diverse enough to produce a general solution.

In this case, the best solutions from the initial set of data are tested against a different set of input data. This procedure is repeated to create a succession of refinements which will create a program solution which produces good results for a large number of problems.

The above traveling salesperson example is limited to four cities for simplicity and is for illustration purposes only. However, the same tree structure can be used to represent the distances between any number of cities. A larger number of cities merely results in a larger tree to represent the input data. The same fitness function (f=(w(n−v)+d)/w) is used regardless of the number of cities (with appropriate changes to the worst case distance w and the number of cities in the entire route n). As the number of cities increases, the time required to generate an acceptable solution increases, but the procedure used to create, evolve, and evaluate program gene strings is unchanged. Thus, once a genetic programming system has been developed to solve a particular type of problem, the same programming system may be used with various sets of input data to determine the best program for solving the given problem.

What is claimed is:

1. A computer-implemented method of solving a programming problem using genetic programming techniques, said method comprising the steps of:

a. defining a fitness function for measuring the relative superiority of a first solution with respect to a second solution;

b. determining the input data from which the problem will be solved;

c. creating a plurality of program graphs containing graph reduction operators, each program graph representing a potential solution to the problem being solved;

d. applying each program graph to said input data to generate a solution for said programming problem;

e. using said fitness function in a problem specific way to assign a fitness to each said program graph based on said solution produced by applying said program graph to said input data;

f. evolving said program graphs based on the evaluation of their fitness; and g. repeating steps (d) through (f) until a termination criteria has been satisfied.

2. A computer-implemented method of solving a programming problem using genetic programming techniques, said method comprising the steps of:

a. defining a fitness function for measuring the relative superiority of a first solution with respect to a second solution;

b. determining the input data from which the problem will be solved;

c. creating a plurality of program graphs containing graph reduction operators, each program graph representing a potential solution to the problem being solved;

d. applying each program graph to said input data to generate a solution for said programming problem;

e. rating the fitness of said solution for said each program graph using said fitness function to assign a raw fitness to said each program graph based on the result produced by applying said each program graph to said input data, and thereafter scaling the fitness measure produced in a problem specific way;

f. evolving said program graphs based on an evaluation of their fitness; and g. repeating steps (d) through (f) until a termination criteria has been satisfied.

3. A computer-implemented method of solving a programming problem using genetic programming techniques, said method comprising the steps of:

a. defining a fitness function for measuring the relative superiority of a first solution with respect to a second solution;

b. determining the input data from which the problem will be solved;

c. creating a plurality of program graphs containing graph reduction operators, each program graph representing a potential solution to the problem being solved;

d. applying each program graph to said input data to generate a solution for said programming problem;

e. using said fitness function to assign a fitness to each said program graph based on the solution produced by applying said program graph to said input data;

e. evolving said program graphs based on the evaluation of their fitness; and f. repeating steps (d) through (f) until a termination criteria has been satisfied.

4. A genetic programming system for solving a programming problem, said system embodied in a custom electronic circuit, comprising:

a genetic program controller for controlling operation of said genetic programming system;

a genetic program memory unit for storing data associated with operation of said genetic programming system, said genetic program memory unit electrically coupled to said genetic program controller;

an input device electrically coupled to said genetic program controller for entering data into said genetic programming system;

a graph reduction machine electrically coupled to said genetic program controller; and a plurality of program graphs stored within said genetic programming system, said program graphs being evolved to approach a desired solution, said graphs containing graph reduction operators.

5. A genetic programming system for finding a program to solve a problem given a particular input, said system comprising:

a memory device for storing various information;

an input device for entering a set of input data containing information to which a problem solution must be obtained, said input data stored in said memory device;

a fitness function providing a measure for determining the relative superiority of a first solution with respect to a second solution, said fitness function stored in said memory device;

a central processing unit electrically coupled to said memory device;

a plurality of program graphs stored in said genetic programming system, said program graphs containing at least one graph reduction operator.

6. The system of claim 5, wherein said central processing unit comprises agraph reduction unit.

7. In a genetic programming system having a plurality of central processing units electrically coupled together and an input device electrically coupled to said central processing units, a method for finding the best program to solve a problem given a particular input and a method of measuring the relative superiority of a first solution with respect to a second solution, said method comprising the steps of:

defining a fitness function for measuring the relative superiority of a first solution with respect to a second solution;

determining the input parameters from which the problem will be solved;

creating a plurality of program graphs containing graph reduction operators, each program graph representing a potential solution to the problem being solved;

applying each said program graph to said input parameters to generate a solution for said problem;

evaluating each program graph by applying it to sample input data and rating the fitness of the evolved program in a problem specific way;

evolving said program graph based on the evaluation of their fitness; and repeating the above steps until a termination criteria has been satisfied.

8. In a genetic programming system having a plurality of central processing units electrically coupled together and an input device electrically coupled to said central processing units, a method for finding the best program to solve a problem given a particular input and a method of measuring the relative superiority of a first solution with respect to a second solution, said method comprising the steps of:

defining a fitness function for measuring the relative superiority of a first solution with respect to a second solution;

determining the input parameters from which the problem will be solved;

creating a plurality of program graphs containing graph reduction operators, each program graph representing a potential solution to the problem being solved;

applying each said program graph to said input parameters to generate a solution for said problem;

evaluating the fitness of said solution using said fitness function to assign a raw fitness to each program graph based on said solution produced by applying said program graph to said input parameters and then scaling said fitness measure produced in a problem specific way;

evolving said program graph based on the evaluation of their fitness; and repeating the above steps until a termination criteria has been satisfied.

9. A genetic programming system for finding a solution to a programming problem having a defined input and a measure for determining the relative superiority of a first solution with respect to a second solution, said system comprising:

means for storing input data in said system;

means for storing a fitness function in said system;

means for storing a termination criteria in said system;

means for storing a plurality of program graphs comprised of graph reduction operators;

means for creating a plurality of program graphs;

means for applying each program graph to said input data to produce an output;

means for evaluating said output with said fitness function to determine a fitness level for each program graph;

means responsive to said fitness level of each program graph for evolving the program graph; and means for repeatedly evolving and evaluating said program graphs until said termination criteria is satisfied.

10. In a genetic programming system having a plurality of central processing units electrically coupled together and an input device electrically coupled to said central processing units, a method for finding the best program to solve a problem given a particular input and a method of measuring the relative superiority of a first solution with respect to a second solution, said method comprising the steps of:

defining a fitness function for measuring the relative superiority of a first solution with respect to a second solution;

determining the input parameters from which the problem will be solved;

creating a plurality of program graphs containing graph reduction operators, each program graph representing a potential solution to the problem being solved;

applying said input parameters to each program graph to generate a solution for each program graph;

evaluating each program graph by applying it to sample input data;

using a fitness function to create a metric of relative superiority of evolved program graphs based on the results produced from executing the program graphs; and repeating the above steps until a termination criteria has been satisfied.

11. The method of claim 1, wherein said step of creating a plurality of program graphs further comprises the creation of at least two individual program graphs.

12. The method of claim 11, wherein said creation of said individual program graphs is accomplished by randomly selecting at least one member of a predetermined set of operators and constants.

13. The method of claim 11, wherein said creation of said at least two individual program graphs is accomplished by a sub-graph and adding said sub-graph to at least one of said at least two individual program graphs.

14. The method of claim 1, wherein said evolving of said program graphs further comprises:

selection of at least two program graphs to create a sub-population;

selection of a first target program graph from said sub-population;

selection of a second target graph from said sub-population;

selection of a portion of said first target program graph;

selection of a portion of said second target program graph;

substituting said portion of said first target program graph for said portion of said second target program graph; and substituting said portion of said second target program graph for said portion of said first target program graph.

15. The method of claim 1, wherein said evolving of said program graphs further comprises replacement of the least superior individual program graphs in said plurality of program graphs with the evolved graphs.

16. The method of claim 1, wherein said evolving of said program graphs further comprises replacement of the least superior individual program graphs in a sub-population of said plurality of program graphs, with the evolved graphs.

17. The method of claim 1, wherein said evolving of said program graphs further comprises replacement of selected graphs in a sub-population of said plurality of program graphs with the evolved graphs.

* * * * *